United States Patent Office 3,498,960
Patented Mar. 3, 1970

3,498,960
PRODUCTION OF RANDOM COPOLYMERS IN ORGANOLITHIUM POLYMERIZATION SYSTEMS
Clinton F. Wofford, Bartlesville, Okla., assignor to Phillips Petroleum Company, a corporation of Delaware
No Drawing. Filed Sept. 28, 1967, Ser. No. 671,241
Int. Cl. C08d 1/20, 3/04
U.S. Cl. 260—84.7                  9 Claims

ABSTRACT OF THE DISCLOSURE

Random copolymers of at least one conjugated diene and at least one monovinyl-substituted aromatic compound are produced in an organolithium polymerization system by polymerizing the monomers in the presence of a hexahydro-1,3,5 - trisubstituted-s-triazine randomizing agent.

---

This invention relates to a method of preparing random copolymers. In another aspect it relates to a process for preparing rubbery copolymers using a randomizing agent.

Processes for preparing copolymers of conjugated dienes and monovinyl-substituted aromatic compounds are described in U.S. Patent 2,975,160, issued Mar. 14, 1961, to R. P. Zelinski. As disclosed in the Zelinski patent, when a mixture of monomers is copolymerized with an organolithium initiator, a polar compound used in admixture with a hydrocarbon diluent promotes the random linkage of monomer units. The polar compond minimizes the formation of a block copolymer structure. Such processes produce a wide variety of useful rubbery polymers.

If the polar compond is omitted from the polymerization mixture, an entirely different type of polymer is obtained, this being a block copolymer in which the monomer units tend to polymerize sequentially. The initially formed polymer block will predominately contain conjugated diene units with small amounts of the vinyl aromatic units therein and the subsequently formed polymer block will be a homopolymer of the vinyl aromatic compound. The physical properties of block copolymers are quite different from the physical properties of random copolymers. It is therefore desirable to perfect improved methods for making random copolymers of conjugated dienes and monovinyl-substituted aromatic compounds.

According to my invention, a special type of randomizing agent is used to form random copolymers of conjugated dienes and vinyl-substituted aromatic compounds in an organolithium polymerization system. I have discovered that by using a hexahydro-1,3,5-trisubstituted-s-triazine randomizing agent it is possible to produce completely random copolymers that have a low vinyl content. I have found that by carrying out my invention, the low vinyl random copolymers can be made by using very small amounts of the randomizing agent.

Accordingly, it is an object of my invention to provide a new and improved method for forming random copolymers. Another object of my invention is to provide an improved method for making low vinyl random copolymers of conjugated dienes and vinyl-substituted aromatic compounds in the presence of small amounts of a randomizing agent.

The term "random copolymer" as applied to the polymer products of this invention is intended to include products ranging from those in which there is substantially no detectable homopolymer block, e.g. vinyl-substituted aromatic polymer blocks, up to copolymers containing about 1 percent by weight of a homopolymer block.

In general, the monomers used in the instant invention are the same as those disclosed in the Zelinski patent referred to above. The conjugated diene monomers that can be employed in the invention contain from 4 to 12 carbon atoms per molecule but preferably are 1,3-butadiene, isoprene, and piperylene.

The vinyl-substituted aromatic compounds that can be used in the present invention are well known to those skilled in the art and can include any monovinyl-substituted aromatic compound that is polymerized with an organolithium initiator. The preferred monovinyl-substituted aromatic compounds include styrene, vinylnaphthalenes such as 1-vinylnaphthalene and alkyl-substituted vinyl aromatic compounds in which the alkyl group is attached to the ring, such as 3-methylstyrene, 2-methylstyrene, 4-ethylstyrene, and the like.

Mixtures of conjugated dienes can be utilized in the present invention as well as mixtures of vinyl-substituted aromatic compounds.

Any member of the known class of organolithium polymerization initiators can be used in the present invention. These initiators are organic compounds which have at least one carbon-lithium bond. Suitable organolithium polymerization initiators are enumerated in U.S. Patent 3,269,978, issued to Short et al. on Aug. 30, 1966; and U.S. Patent 3,215,679, issued to Trepka on Nov. 2, 1965. The organolithium initiators most commonly used are those having the formula $RLi_x$, where R is an aliphatic, cycloaliphatic or aromatic hydrocarbon radical containing from 1 to 20 carbon atoms and $x$ is an integer of from 1 to 4. Other preferred organolithium initiators are 3-bromophenyllithium, lithium adducts of naphthalene, and lithium adducts of stilbene. Still other preferred initiators include reaction products between the compounds of the formula $RLi_x$ as disclosed hereinabove and one of a divinyl aromatic or a trivinyl aromatic compound containing one or two aromatic rings or alkyl substituted aromatic rings, the total of the alkyl substituents on any di- or trivinyl aromatic compound not exceeding 12 carbon atoms. Examples of suitable vinyl aromatic compounds for reaction with the organolithium compounds include divinylbenzene, trivinylnaphthalene, divinylnaphthalene, divinylbiphenyl and the like. The amount of initiator used is generally in the range of about 0.05 to 150 gram millimoles, preferably 0.5 to 20 gram millimoles per 100 grams of monomers.

The polymerization is preferably carried out in the presence of a hydrocarbon diluent which can be one or more aromatic, paraffinic or cycloparaffinic compounds, preferably containing 4 to 10 carbon atoms per molecule. The polymerization diluent is a liquid under the conditions of the process. Examples of suitable polymerization diluents are butane, n-pentane, isooctane, cyclohexane, benzene, toluene, xylene, ethylbenzene, hexane, and the like. Mixtures of the diluents can be used.

The polymerization temperature can vary over a broad range. The polymerization temperature is usually in the range of from about −20 to about 150° C. The preferred temperature range is from about 30 to 125° C. The pressure maintained during the polymerization process is preferably sufficient to maintain a substantially liquid phase in the polymerization zone.

The randomizing agents employed according to the present invention are hexahydro-1,3,5-trisubstituted-s-triazines. These randomizing agents have the following structural formula:

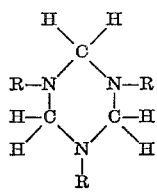

where R is a hydrocarbon radical of the group consisting of alkyl, alkenyl, cycloalkyl, cycloalkenyl, aryl, and combinations thereof. Each R group contains from 1 to 12 carbon atoms. Mixtures of randomizing agents having the above formula can be utilized in the practice of this invention. However, it is necessary that at least one randomizing agent have the above structural formula. Examples of suitable randomizing agents of this invention are as follows:

hexahydro-1,3,5-trimethyl-s-triazine
hexahydro-1,3,5-triethyl-s-triazine
hexahydro-1,3,5-triisopropyl-s-triazine
hexahydro-1,3,5-tri-n-octyl-s-triazine
hexahydro-1,3,5-tri-n-dodecyl-s-triazine
hexahydro-1,3,5-trivinyl-s-triazine
hexahydro-1,3,5-triallyl-s-triazine
hexahydro-1,3,5-tri(4-hexenyl)-s-triazine
hexahydro-1,3,5-tri(4,5-dimethyl-7-decenyl)-s-triazine
hexahydro-1,3,5-triphenyl-s-triazine
hexahydro-1,3,5-tri(2-naphthyl)-s-triazine
hexahydro-1,3,5-tricyclohexyl-s-triazine
hexahydro-1,3,5-tri(3-cyclohexenyl)-s-triazine
hexahydro-1,3,5-tri(3,5-diethyloctyl)-s-triazine
hexahydro-1,3,5-tri(3,5-di-n-propylcyclopentyl)-s-triazine
hexahydro-1,3-di-n-pentyl-5-(3-cyclopentenyl)-s-triazine
hexahydro-1-methyl-3,5-di(4-tolyl)-s-triazine
hexahydro-1,3-di-n-decyl-5(3,5-di-n-propylphenyl)-s-triazine
hexahydro-1,3,5-tribenzyl-s-triazine The quantity of randomizing agent employed in this invention is in the range of from about 0.08 to about 10 gram millimoles of randomizing agent per 100 grams of monomers in the polymerization system. The preferred range is from 0.1 to 5 gram millimoles of randomizing agent per 100 grams of monomers in the polymerization system. The amount of randomizing agent is generally influenced by the polymerization temperature, higher temperatures requiring larger amounts of randomizing agents than are necessary at lower polymerization temperatures.

In addition to being effective in very small amounts in directing random copolymerization, the use of the randomizing agents of this invention greatly simplifies the recovery of the hydrocarbon diluent. The randomizing agents have sufficiently high boiling points that they are not carried over with the polymerization diluent when it is flashed from the polymer solution at the end of the polymerization period. At the end of the polymerization period, the polymerization mixture can be passed to a zone where a polymerization shortstop such as rosin acid, stearic acid, or other catalyst inactivating agent is added, followed by passing this mixture to a zone of lower pressure. This zone of lower pressure (flash separator) causes a portion of the polymerization diluent to be flashed overhead. Because of the high boiling characteristics of the randomizing agents of this invention, substantially pure polymerization diluent can be recovered. This polymerization diluent, that contains substantially no randomizing agent, can then be utilized for the production of block copolymers, without the necessity of carrying out expensive and time consuming purification steps to remove the randomizing agent therefrom. The conditions of the flash separator can be controlled to vaporize and remove at least 50 percent, and in many instances 75 percent or more, of the hydrocarbon polymerization diluent that is relatively free of the randomizing agents of this invention.

Although the conversion in such a polymerization process is frequently quantitative, if unreacted monomer remains, most of the unreacted monomer will be recovered in the flashed overhead from the flash separator. This vapor or vapor mixture can be condensed and stored until needed for another polymerization reaction.

In some instances, it may be desirable to carry out a steam stripping process at the end of the polymerization reaction. In such instances, the randomizing agents of this invention will decompose into certain low boiling components that can be readily removed from the system in the overhead from the steam stripping zone. In some instances, it is desirable to add an acid compound such as a mineral acid, a rosin acid, stearic acid, and the like to facilitate in the decomposition of the randomizing agent.

An antioxidant material is usually added to the polymer solution prior to the removal of the polymerization diluent. Thereafter, the polymer solution can be subjected to well known recovery processes, such as flash separation, steam stripping and the like to recover the random copolymer containing small amounts of the antioxidant material.

The random copolymers made in accordance with this invention have a lower vinyl content than random copolymers generally made with ether type randomizing agents. The random copolymers of the invention exhibit good tread wear characteristics when utilized in the production of tires for automobiles and trucks. The random copolymers of the invention find many other uses in the production of rubber appliances and the like.

In order to illustrate further the advantages of my invention, the following examples are presented. The materials, proportions and conditions used in these examples are typical only and should not be construed to limit my invention unduly.

EXAMPLE I

Hexahydro-1,3,5-trimethyl-s-triazine was employed as a randomizing agent for the copolymerization of butadiene with styrene in the presence of n-butyllithium as the catalyst. Reactions were conducted at different temperature levels using variable amounts of catalyst level and randomizing agent. The recipe was as follows:

| | Parts by weight |
|---|---|
| 1,3-butadiene | 75 |
| Styrene | 25 |
| Cyclohexane | 780 |
| n-Butyllithium | Variable |
| Randomizing agent | Variable |
| Temperature, ° C. | 30, 50, 70 |
| Time, hours | Variable |

In all runs the diluent was charged first after which the reactor was purged with nitrogen. Butadiene was added followed by the styrene. In runs 1 through 6, the randomizing agent was added after the styrene and the butyllithium was introduced last. The randomizing agent was added last in runs 7 through 13. At the conclusion of each polymerization, the reaction was terminated with a solution of 2,2'-methylene-bis(4-methyl-6-tert-butylphenol) in a mixture of equal parts by volume of toluene and isopropyl alcohol, the amount used being sufficient to provide one part by weight of the antioxidant per 100 parts by weight of polymer. The product was coagulated in isopropyl alcohol, separated and dried. Data are presented in Table I.

hydro-1,3,5-triisopropyl-s-triazine as the randomizing agent. Except for the type and amounts of randomizing

TABLE I

| Run No. | n-BuLi P.h.m. | n-BuLi M.h.m. | Randomizing agent P.h.m. | Randomizing agent M.h.m. | Temp., °C. | Time, hrs. | Conv., percent | Inh.[1] visc. | Polystyrene,[2] wt. percent | Microstructure, percent [3] Cis | Trans | Vinyl |
|---|---|---|---|---|---|---|---|---|---|---|---|---|
| 1 | 0.32  | 5   | 0.13  | 1.0 | 70 | 1    | 100 | 0.46 | 0 | 28.1 | 57.1 | 14.8 |
| 2 | 0.192 | 3   | 0.13  | 1.0 | 70 | 1.25 | 94  | 0.84 | 0 | 31.5 | 53.2 | 15.3 |
| 3 | 0.192 | 3   | 0.18  | 1.4 | 70 | 1.2  | 96  | 0.77 | 0 | 29.8 | 52.5 | 17.7 |
| 4 | 0.192 | 3   | 0.26  | 2.0 | 70 | 1    | 99  | 0.89 | 0 | 27.9 | 52.9 | 19.2 |
| 5 | 0.192 | 3   | 0.65  | 5.0 | 70 | 1    | 99  | 0.91 | 0 | 24.3 | 47.3 | 28.4 |
| 6 | 0.154 | 2.4 | 0.13  | 1.0 | 70 | 1    | 100 | 1.16 | 0 | 28.9 | 53.1 | 18.0 |
| 7 | 0.064 | 1   | 0.052 | 0.4 | 50 | 7    | 94  | 2.93 | 0 | 28.3 | 54.1 | 17.6 |
| 8 | 0.064 | 1   | 0.077 | 0.6 | 50 | 7    | 97  | 2.15 | 0 | 25.6 | 51.2 | 23.2 |
| 9 | 0.064 | 1   | 0.13  | 1.0 | 50 | 7    | 97  | 2.30 | 0 | 23.4 | 47.5 | 29.1 |
| 10 | 0.064 | 1  | 0.26  | 2.0 | 50 | 4    | 100 | 1.53 | 0 | 20.7 | 46.1 | 33.2 |
| 11 | 0.064 | 1  | 0.013 | 0.1 | 30 | 49   | 100 | 1.99 | 0 | 30.1 | 56.4 | 13.5 |
| 12 | 0.064 | 1  | 0.026 | 0.2 | 30 | 49   | 100 | 1.83 | 0 | 26.7 | 55.3 | 18.0 |
| 13 | 0.064 | 1  | 0.052 | 0.4 | 30 | 49   | 100 | 1.92 | 0 | 21.8 | 47.9 | 30.3 |

[1] Determined by the procedure shown in Farrar et al., U.S. 3,215,682, columns 5 and 6.
[2] Determined by oxidative degradation according to the procedure shown in Zelinski, U.S. 2,975,160, column 8.
[3] Determined by infrared analysis; microstructures normalized to reflect the diene portion only. Determined by the procedure shown in Farrar et al., U.S. 3,215,682, columns 5 and 6.
NOTE.—P.h.m.=Parts by weight per 100 parts by weight monomers; M.h.m.=Gram millimoles per 100 grams monomers.

The data show that completely random copolymers were obtained in all cases, as evidenced by the fact that no detectable polystyrene was obtained. Complete randomization resulted with 1.0 m.h.m. (0.13 p.h.m.) or less of the randomizing agent at each polymerization temperature. The data also show that polymers with a vinyl content below 20 percent could be obtained.

EXAMPLE II

Two runs were conducted in which hexahydro-1,3,5-triethyl-s-triazine was employed as a randomizing agent for the copolymerization of butadiene with styrene. The following recipe was used:

|  | Parts by weight |
|---|---|
| 1,3-butadiene | 75 |
| Styrene | 25 |
| Cyclohexane | 780 |
| n-Butyllithium | 0.128 (2 m.h.m.) |
| Randomizing agent | 0.43, 0.86 |
| Temperature, °C. | 70 |
| Time, hours | 2 |
| Conversion, percent | 100 |

The procedure was the same as in Example I. Results were as follows:

|  | 1 | 2 |
|---|---|---|
| Randomizing agent: | | |
| P.h.m | 0.43 | 0.86 |
| M | 2.5 | 5.0 |
| Inherent viscosity [1] | 1.08 | 1.10 |
| Polystyrene, wt. percent [1] | 0 | 0 |
| Microstructure, percent: [1] | | |
| Cis | 33.5 | 28.0 |
| Trans | 47.2 | 44.9 |
| Vinyl | 19.3 | 27.1 |

[1] Determined by procedures shown in Example I.

These data show that hexahydro-1,3,5-triethyl-s-triazine functions as a randomizing agent for the copolymerization of butadiene with styrene.

EXAMPLE III

Random copolymers of butadiene with styrene were prepared using n-butyllithium as the catalyst and hexahydro-1,3,5-triisopropyl-s-triazine as the randomizing agent. Except for the type and amounts of randomizing agent, the recipe was the same as that employed in Example II. Results were are follows:

|  | 1 | 2 | 3 |
|---|---|---|---|
| Randomizing agent: | | | |
| Phm | 0.21 | 0.53 | 1.1 |
| Mhm | 1.0 | 2.5 | 5.0 |
| Conversion, percent | 97 | 99 | 99 |
| Inherent viscosity [1] | 0.85 | 0.93 | 1.00 |
| Polystyrene, wt. percent [1] | 0 | 0 | 0 |
| Microstructure, percent: | | | |
| Cis | 22.8 | 19.4 | 22.4 |
| Trans | 46.9 | 45.7 | 43.5 |
| Vinyl | 30.3 | 34.9 | 34.1 |

[1] Determined by procedures shown in Example I.

These data demonstrate that completely random copolymers are obtained when the randomizing agent is hexahydro-1,3,5-triisopropyl-s-triazine.

As will be apparent to those skilled in the art, various modifications of this invention can be made without departing from the scope and spirit thereof.

I claim:
1. A method for forming a random copolymer comprising polymerizing in a diluent at least one conjugated diene containing from 4 to 12 carbon atoms in the molecule, and at least one monovinyl-substituted aromatic compound with an organolithium initiator in the presence of at least one randomizing agent having the formula:

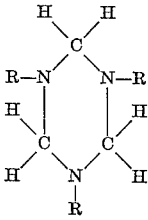

wherein R is a hydrocarbon radical of the group consisting of alkyl, cycloalkyl, alkenyl, cycloalkenyl, aryl and combinations thereof containing from 1 to 12 carbon atoms, wherein said randomizing agent is present in an amount in the range of about 0.08 to about 10 gram millimoles per 100 grams of polymerizable monomers.

2. The method of claim 1 wherein said contacting is carried out in the presence of a hydrocarbon diluent at a temperature in the range of about —20 to 150° C.

3. The method of claim 2 wherein said initiator has the formula $RLi_x$ where R is an aliphatic, cycloaliphatic, aromatic, or halogen-substituted aromatic radical and $x$ is an integer of from 1 to 4.

4. The method of claim 2 wherein said conjugated diene is 1,3-butadiene and said vinyl-substituted aromatic compound is styrene.

5. The method of claim 3 wherein said conjugated diene is 1,3-butadiene and said vinyl-substituted aromatic compound is styrene.

6. The method of claim 5 wherein said randomizing agent is hexahydro-1,3,5-triethyl-s-triazine.

7. The method of claim 5 wherein said randomizing agent is hexahydro-1,3,5-triisopropyl-s-triazine.

8. The method of claim 5 wherein said randomizing agent is hexahydro-1,3,5-trimethyl-s-triazine.

9. The method of claim 8 wherein said organolithium initiator is n-butyllithium.

References Cited

UNITED STATES PATENTS

| 2,975,160 | 3/1961 | Zelinski | 260—83.7 |
| 3,366,611 | 1/1968 | Wofford | 260—84.7 |

JAMES A. SEIDLECK, Primary Examiner

U.S. Cl. X.R.

260—83.7